United States Patent
de Wit et al.

(10) Patent No.: US 9,214,681 B2
(45) Date of Patent: Dec. 15, 2015

(54) EXTENDED DURATION POWER SUPPLY

(75) Inventors: Frank de Wit, Nieuwegein (NL); Florin Tatar, Delft (NL)

(73) Assignee: AKTIEBOLAGET SKF, Gothenburg (SE)

( * ) Notice: Subject to any disclaimer, the term of this patent is extended or adjusted under 35 U.S.C. 154(b) by 421 days.

(21) Appl. No.: 13/255,678

(22) PCT Filed: Mar. 10, 2009

(86) PCT No.: PCT/EP2009/001775
§ 371 (c)(1),
(2), (4) Date: Sep. 9, 2011

(87) PCT Pub. No.: WO2010/102646
PCT Pub. Date: Sep. 16, 2010

(65) Prior Publication Data
US 2011/0316484 A1     Dec. 29, 2011

(51) Int. Cl.
| H01M 10/44 | (2006.01) |
| H01M 6/14 | (2006.01) |
| H01M 4/38 | (2006.01) |
| H01M 6/50 | (2006.01) |
| H01M 16/00 | (2006.01) |

(52) U.S. Cl.
CPC ............... *H01M 6/14* (2013.01); *H01M 4/382* (2013.01); *H01M 6/5033* (2013.01); *H01M 16/00* (2013.01); *H01M 2200/108* (2013.01)

(58) Field of Classification Search
CPC .. H02J 2007/0067; H02J 7/163; H01M 10/44
USPC ......................................................... 320/135
See application file for complete search history.

(56) References Cited

U.S. PATENT DOCUMENTS

| 4,481,506 | A | * | 11/1984 | Honma | ........................ | 340/630 |
| 4,608,322 | A | * | 8/1986 | Howard et al. | ............... | 429/105 |
| 5,444,434 | A | * | 8/1995 | Serby | ............................. | 340/628 |
| 6,194,882 | B1 | * | 2/2001 | Mirow et al. | .................. | 323/282 |
| 6,815,930 | B2 | * | 11/2004 | Goodman | ..................... | 320/134 |
| 2004/0154563 | A1 | * | 8/2004 | Long | ........................... | 123/90.11 |
| 2004/0232879 | A1 | | 11/2004 | Wang | | |
| 2005/0202785 | A1 | * | 9/2005 | Meyer | ......................... | 455/66.1 |
| 2007/0046255 | A1 | * | 3/2007 | Kim | .............................. | 320/107 |
| 2008/0248375 | A1 | * | 10/2008 | Cintra et al. | .................... | 429/94 |

FOREIGN PATENT DOCUMENTS

| EP | 0657982 | A | 6/1995 |
| JP | 59087771 | A | 5/1984 |
| WO | WO9928982 | A | 6/1999 |

\* cited by examiner

*Primary Examiner* — Drew A Dunn
*Assistant Examiner* — Jerry D Robbins
(74) *Attorney, Agent, or Firm* — Bryan Peckjian; SKF USA Inc. Patent Dept.

(57) ABSTRACT

The present invention concerns a power supply (10) comprising a primary cell (11) adapted to provide a primary cell current. The primary cell (11) comprises an anode, a cathode current collector and an electrolyte, whereby a passivation layer is formed on a surface of the anode as a result of a chemical reaction between the anode and the electrolyte. To ensure that the passivation layer remains essentially intact for the lifetime of the primary cell, the power supply (10) further comprises a current limiter (12) that is configured to prevent the magnitude of the primary cell current exceeding a value that would damage the passivation layer.

13 Claims, 1 Drawing Sheet

EXTENDED DURATION POWER SUPPLY

TECHNICAL FIELD

This invention relates to a power supply comprising a primary cell, which is configured to deliver a continuous primary cell current for an extremely long duration. The invention is further directed to autonomous devices provided with the inventive power supply.

BACKGROUND

An autonomous device requiring a continuous and very low level of electrical power is generally provided with an internal electrical power source such as a battery, to supply the required power. Whilst the storage and discharge properties of the battery are selected to be appropriate for the device, such batteries do not always provide the anticipated amount of current or power before becoming depleted. This makes it difficult to ensure a reliable duration of the power source. Whilst the battery may be over-specified in an attempt to alleviate this, such a solution is not ideal and will not always resolve the problem.

One of the aims of the present invention is to improve the reliability and/or increase the duration of this kind of power supply, so as to reduce the intervention needed for an autonomous device that is powered therewith.

DISCLOSURE OF THE INVENTION

According to one of its aspects, the present invention provides a power supply comprising a primary cell adapted to provide a primary cell current. The primary cell comprises an active metal anode and a cathode current collector which are in contact with an electrolyte, whereby a passivation layer is formed on a surface of the anode as a result of a chemical reaction between the anode and the electrolyte. To ensure that the passivation layer remains essentially unaffected for the lifetime of the primary cell, the power supply further comprises a current limiter that is configured to prevent the magnitude of the primary cell current exceeding a primary current threshold value. This threshold value corresponds to a maximum primary current density, which is lower than a current density at which the passivation layer starts to break down. As used herein, the term "primary current density" is to be understood as the primary cell current per unit surface area of the anode.

In one example of a power supply according to the invention, the primary cell is a liquid cathode lithium cell, such as a lithium thionyl chloride battery having a lithium anode, a carbon cathode current collector and an electrolyte comprising a solution of lithium aluminium tetrachloride in thionyl chloride. Typically, the cell will also comprise a porous separator, e.g. a layer of non-woven fibreglass material, which physically and electrically isolates the lithium anode from the carbon cathode, but which allows the migration of ions via the electrolyte. During the manufacturing process, the battery is filled with the electrolyte solution and upon contact, the lithium anode reacts with the electrolyte and a passivation layer of aluminium chloride forms on the anode. Without the passivation layer, this type of lithium battery would not function as an energy storage device because the lithium would self-discharge and degrade quite rapidly. Thus, the passivation layer allows the battery to have a very low self discharge rate and a long shelf life.

When the battery is placed in a circuit and current is drawn, the battery discharges. At very low discharge rates, i.e. at current densities of 5-10 $\mu A/cm^2$, the passivation layer remains essentially unaffected, whereby battery operation is enabled by the migration of lithium ions through the passivation layer towards the cathode. As the rate of discharge increases, so does the porosity of the passivation layer, allowing greater ion flow and higher power output. The higher the current drawn, the higher the current density becomes until the atomic forces become so great that parts of the passivation layer are torn away. This is thought to occur at current densities of greater than 100 $\mu A/cm^2$. If the current density then falls to a lower level, the passivation layer starts to rebuild, but the rebuilding of the passivation layer requires energy and occurs at a loss of battery capacity. The inventors believe that even a spike of current in excess of the primary current threshold value can damage the passivation layer to an extent that leads to a loss of battery capacity when the damage is repaired.

Furthermore, as mentioned, the passivation layer minimises self discharge. It has been found that the rate of self-discharge increases in the absence or partial absence of a passivation layer, even when a continuous low current is drawn from the battery.

Thus, the current limiter in a power supply according to the invention is configured to keep the primary cell current below a primary current threshold value that corresponds to a maximum current density at which the passivation layer remains undamaged. The term "undamaged" is to be understood as meaning that no depassivation of the passivation layer occurs during use of the inventive power supply.

Preferably, the primary cell current is limited to a corresponding primary current density of 10 $\mu A/cm^2$ or less. More preferably, the current limiter limits the current density to 5 $\mu A/cm^2$ or less, to prevent any increase in the porosity of the passivation layer and prevent any significant leakage current from the battery once placed in a circuit. The effect of the present invention, therefore, is to minimise such leakage currents and to prevent loss of battery capacity through 'self-repair' of a damaged passivation layer. A power supply according to the invention can therefore continuously power a device for at least 20 years, preferably at least 25 or 30 years.

The current limiter is suitably selected to ensure that at no time, not even on first operation, does the primary cell current exceed a level that would lead to depassivation of the anode. This is in contrast with known methods of operating e.g. lithium cells, in which it is common practice to carry out a depassivation procedure before the battery is put into service. Such a procedure involves subjecting the battery to a depassivation load (e.g. a resistance of 500Ω) for a period of time. Cell depassivation is performed to counteract the problem of voltage delay, which is a time lag that occurs between the application of a load and the voltage response when the corresponding load current density is too high to pass through the passivation layer without breaking it. In other words, the passivation layer slows the battery response, which can be a problem in the case of e.g. a failsafe device in which an immediate back-up current is required.

Voltage delay is not a problem in a power supply according to the invention, because the primary cell current is limited to a value at which the metal ions in the battery can pass through the passivation layer unhindered. Thus, a battery in a power supply according to the invention is discharged at a very low rate, which has the further advantage of preventing carbon pore blockage when the battery has a carbon cathode. During battery discharge at a rate that breaks the anode passivation layer, the broken-off pieces of the layer and other discharge products are deposited or precipitated in the carbon electrode pores, thereby blocking access to unused reaction sites and reducing battery capacity. This mechanism is also known as cathode passivation and is a common cause of premature depletion, particularly in lithium batteries. Limiting the primary cell current to a value that does not damage the passivation layer therefore has several benefits.

In a power supply according to the invention, the actual primary current threshold value depends on the battery design. In one example, the primary cell is a commercially available 3.6 V lithium thionyl chloride battery with an anode surface area of 14 cm². Suitably, the current limiter can be a 68 kΩ resistor that limits the primary cell current to a threshold value of approximately 53 μA, which corresponds to a maximum current density of approximately 3.8 μA/cm². The passivation layer on the anode will therefore remain intact for the lifetime of the battery.

Besides lithium thionyl chloride batteries, lithium sulphur dioxide batteries may also be used in the invention. These types of lithium battery display an extremely stable voltage discharge characteristic over their lifetime and are therefore suitable for providing a reliable power supply for the long durations envisaged in the present invention. In principle, however, the service life of any type of primary cell that comprises a passivation layer can be prolonged by means of the present invention.

An example of a device that can be powered by a power supply according to the invention is a device comprising a microprocessor and/or a data store. The device may be configured so that a current, particularly a steady state current, drawn from the primary cell is less than or equal to: 50 μA; 30 μA; or 20 μA. The current may be greater than or equal to 5 μA or 10 μA. Preferably, the current drawn from the primary cell is sufficient to continuously power a processor and/or a data store of the device.

In some applications, the primary current threshold value of the power supply may be insufficient to enable the device to periodically draw a desired load current. In the case of a data collector or machine condition monitor, such a load current may be required to collect measurements, for example using a sensor, and/or to communicate via a wireless interface.

Consequently, in a further development of the invention, the power supply additionally comprises an energy storage device that is configured to be charged using the primary cell current and to periodically provide a load current at a magnitude greater than the primary current threshold value. The load current may be supplied in part or in whole by the energy storage device.

The energy storage device may store excess energy drawn from the primary cell i.e. current which is not required for steady state operation of the device, for example to power a processor and/or data store of a data collector. The energy storage device may comprise a capacitor, preferably a super capacitor; such a capacitor will preferably have a very low discharge rate of less than 1% of the continuous discharge rate of the battery.

The device may comprise volatile and/or non-volatile memory. In one arrangement, the memory is constantly supplied with current from the primary cell; this may allow the use of low power volatile memory rather than, for example, a non-volatile memory requiring a greater energy supply for storage.

Wireless devices using the present invention may communicate using an existing wireless network. Data collection using the present invention may be used to collect acceleration, velocity, vibration, temperature, pressure and/or condition data. The device may be configured to automatically upload such data, for example for viewing and analysis, in a centralised monitoring system. Data collection or monitoring using the invention may be continuous or periodic.

The invention allows a device to function using a primary cell battery in a particular mode so as to ensure that the device can run for an extended period of time without requiring battery replacement. This reduces the necessity for maintenance and/or intervention for the device.

The invention may be used in relation to a data collector, for example a machine condition monitor, in particular for monitoring the condition of bearings during operation of a machine. Such monitoring may be used to detect abnormalities, plan preventive maintenance and avoid bearing failure. More particularly, the invention may be used in relation to inline machine condition monitoring in which a machine condition monitor is attached to a machine and left in place, so as to provide for continuous or periodic monitoring. Data from such inline monitors may be transmitted, for example for storage and/or processing, over a wireless interface; the data may be collected from the monitor, for example, using a portable data collector connectable to the monitor, for example using a wired or wireless connector. The invention may be particularly useful in relation to monitoring systems which comprise a network of individual monitors, each of which monitors one of a plurality of machines and provides data to a central processor on a continuous or periodic basis, for example using a wireless interface.

Inline machine condition monitoring may be used to alleviate the need for maintenance personnel to collect data using portable data collectors, for example hand held vibration analysers. Inline condition monitoring is often employed for critical plant equipment or for equipment for which access by maintenance personnel would be difficult and/or present safety risks. In some circumstances, it is not convenient to hard-wire machine condition monitors, particularly where access is difficult and/or the provision of electrical wires to provide for power and/or data transmission is not convenient. Wireless monitoring may be used to alleviate the need for hard wiring and may be particularly appropriate, for example, for Machines in areas that are inaccessible, difficult or dangerous to reach;
Moving machine components where hard-wiring is not possible;
Machines that are frequently moved within a facility;
Equipment that is transported and used at different sites;
Areas in which it is expensive or hazardous to install cables.

However, wireless condition monitoring presents problems of its own, particularly in terms of the condition monitors' autonomy. Frequent verification and/or intervention by maintenance personnel of condition monitors is disadvantageous; this creates additional work (maintaining the monitoring system in addition to maintaining the machines) and is exacerbated where the installed condition monitors are not readily accessible. Similar considerations may apply for other types of autonomous devices.

Preferably, a data collector or condition monitor in accordance with the invention is configured to run without requiring verification and/or replacement of the primary cell for at least the lifetime of the machine that it is intended to monitor. In this way, the battery of the condition monitor may never need replacement during the lifetime of a machine which it monitors. Whilst the power supply of the present invention has been developed in particular with respect to data collectors and condition monitors, it may be used in other applications. For example, the invention may be used in relation to implants, for example medical or biomedical implants. Such implants may have a primarily operational function, for example a pacemaker. Such implants may also have a monitoring function. A power supply according to the invention can improve the reliability of the duration of such implants; this may reduce the need for surgery to replace or maintain the devices. In addition, alarm systems and remote metering systems may advantageously by powered by a power supply according to the invention Further advantages of the present invention will become apparent from the detailed description and accompanying figures.

BRIEF DESCRIPTION OF DRAWINGS

The invention will now be described, by way of example only, with reference to the following figures in which.

DETAILED DESCRIPTION

Figure 1:
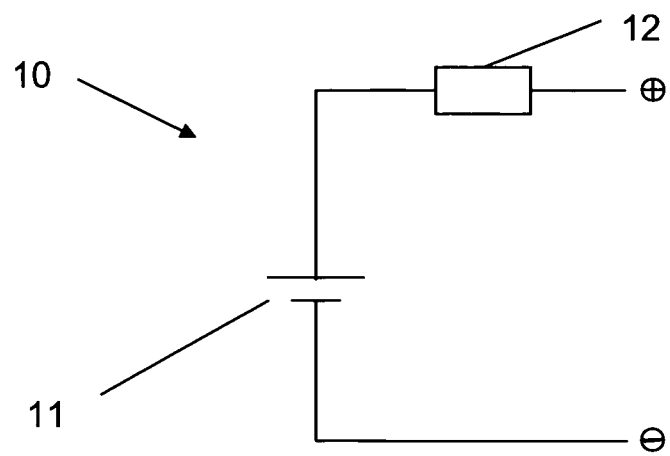
FIG. 1 shows a power supply according to the invention.

FIG. 1 illustrates an example of a power supply according to the present invention. The power supply 10 comprises a primary cell 11, which is a conventional battery of the type having an anode, a cathode current collector and an electrolyte. The primary cell 11 is further of the type which comprises a passivation layer on a surface of the anode, formed as a result of a chemical reaction between the anode and the electrolyte. In the example shown, the primary cell is a 3.6 V lithium thionyl chloride battery. Such batteries are particularly suitable for reliably providing power, preferably continuous power (particularly at low current levels), to a device for a long duration. Such batteries also have a long shelf life, due to the passivation layer, which layer largely prevents self discharge of the battery.

Although lithium batteries are often designated as long-life batteries, the inventors have found that when connected to a device such as e.g. a machine condition monitor, the battery (or batteries) does not always last as long as expected, even at low continuous currents. The reduced battery duration can be due to leakage currents, particularly self discharge which continues to occur during battery operation.

As mentioned, the passivation layer largely prevents self-discharge and it is thought that the rate of self discharge increases when the passivation layer breaks down. It has been found that at discharge current densities of less than 10 $\mu A/cm^2$, the passivation layer remains essentially unaffected. As the rate of discharge increases, so does the porosity of the passivation layer, until a level is reached at which the parts of the passivation layer are torn off. This is thought to occur at current densities of around 100 $\mu A/cm^2$ and greater. If the battery is then subjected to a much lower rate of discharge (or if no current is drawn), a chemical reaction will again take place between the anode and the electrolyte and the passivation layer will be rebuilt. This rebuilding of the passivation layer requires energy and consequently occurs at loss of battery capacity.

The present inventors believe that even a spike of current drawn from the primary cell 11 which leads to a discharge current density significantly greater than 10 $\mu A/cm^2$ can cause a deterioration in the passivation layer that results in:
i. an increase in the self discharge rate of the primary cell and/or
ii. a loss of battery capacity after the passivation layer has been repaired.

Thus, in a power supply according to the invention, the power supply 10 further comprises a current limiter 12, which prevents the current drawn from the primary cell 11 exceeding a predetermined primary current threshold value and thereby prevents the current density exceeding a value at which the passivation layer starts to break down. The current limiter 12 can be either active, i.e. capable of being regulated, or can be passive, e.g. a resistor. Preferably, the primary current threshold value corresponds to a current density of 10 $\mu A/cm^2$ or less. More preferably, the threshold value corresponds to a current density of approximately 5 $\mu A/cm^2$ or less.

The primary current threshold value depends on the battery design. Some lithium primary cells have a spiral anode with a relatively high surface area in the region of 14 $cm^2$. For this design of lithium battery, the primary current threshold value can be set at ~70 $\mu A$, which limits the discharge current density to ~5 $\mu A/cm^2$. Using the given example of a 3.6 V lithium thionyl chloride battery, the current limiter 12 can suitably be a 50 k$\Omega$ resistor. Other commercially available lithium cells have an anode surface area of approximately 6 $cm^2$. Assuming the same battery voltage, the current limiter 12 can then, for example, be a 100 kn resistor, which sets the primary cell threshold current at 36 $\mu A$ and limits the discharge current density to ~6 $\mu A/cm^2$. The above calculations are based on the maximum short-circuit current.

The primary current threshold can also be set lower than the values calculated above, depending on the power requirement of the application in question.

Because the passivation layer remains unbroken, the primary cell 11 has an extremely low self-discharge rate, which extends the life of a power supply according to the invention in comparison with conventional power supplies. A power supply according to the invention is therefore suited to long-life applications where it is desirable to delay battery replacement as long as possible; for example, in the case of a battery for a pacemaker or for an autonomous sensor that is mounted in an inaccessible location. It is envisaged that a power supply according to the invention can achieve a service life of 30 years.

For example, commercially available AA-size lithium thionyl chloride batteries with a nominal capacity of ~2.6 Ah can be used in the invention. Assuming 30 years of operation at an average self-discharge loss of 1% per year, the expected capacity of a power supply according to the invention comprising this type of battery is then 70% of the nominal capacity: 1.82 Ah. There are approximately 263000 hours in 30 years, meaning that the battery can supply a continuous current of ~6.9 $\mu A$ for the duration of its 30-year life. A primary cell current of 6.9 $\mu A$ is sufficient to continuously power e.g. a microprocessor.

A power supply according to the invention can therefore supply a continuous low current to a device for an extremely long duration. In some applications, the device powered by a power supply may require a continuous low-level current and have an intermittent need for a current that is higher than the primary cell current. One example of a device with this kind of power requirement is a machine condition monitor comprising a microprocessor, a sensor and a data store. A primary cell current of e.g. 10 $\mu A$ is sufficient to continuously power the microprocessor and the data store, but a higher load current of e.g. 20 mA is intermittently required to perform measurements.

Figure 2:
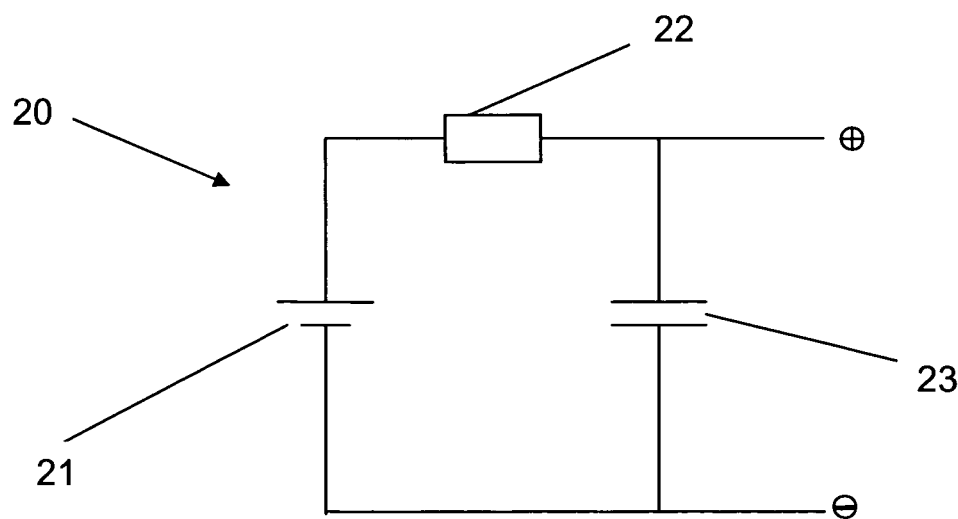
FIG. 2 shows a power supply according to a further development of the invention.

FIG. 2 illustrates an example of a further development of a power supply according to the invention that is suitable for a device as described above.

In this example, the power supply 20 comprises a primary cell 21 of a type described with reference to FIG. 1, i.e. a 3.6

V lithium thionyl chloride battery with an anode surface area of 6 cm² and a nominal capacity of 2.6 Ah. The current limiter 22 in the example shown is a 120 kΩ resistor, meaning that the primary current threshold value is 30 μA, corresponding to a maximum primary current density of 5 μA/cm². According to the further development of the invention, the power supply 20 additionally comprises an energy storage device 23, suitably a capacitor. The capacitor 23 is configured to be charged using current drawn from the primary cell 21 (the primary cell current) and to periodically provide a load current at a magnitude greater than the primary current threshold value. The arrangement is such that the primary cell current never exceeds the primary current threshold value, neither when the primary cell is first put in to operation nor during operation of the device, thereby ensuring a long and reliable service life of the power supply 20.

When the power supply 20 is used to power a machine condition monitor comprising a microprocessor, a data store and a sensor, a continuous current of approximately 10 μA is needed to power the processor and the data store. Therefore, around 20 μAh/h remains available for charging the capacitor. As the primary cell current charges the capacitor 23, the voltage across the capacitor will rise with an RC type curve.

The efficiency of the power supply circuit could be improved, for example, by using semiconductors in the current limiter. Nevertheless, a circuit as described with respect to FIG. 2, and also with respect to FIG. 1, has the benefit of simplicity.

When the capacitor 23 has charged, it can supply a load current greater than the primary threshold current in short bursts. For example, if the sensor in the machine condition monitor is a strain sensor, a measurement can be performed by drawing a load current of e.g. 20 mA for 10 milliseconds. In the given example, this allows several measurements per hour. Furthermore, if the condition monitor is provided with means for wireless transmission of data, a packet of data can be transmitted by drawing a load current of e.g. 25 mA for 100 milliseconds.

Even at a substantially empty battery condition, the primary cell current is preferably sufficient to provide a small charge surplus to charge the capacitor 23, for example if a processor drawing part of the primary cell current is in a sleep state. The time required to provide a desired amount of charge to the capacitor 23 will depend upon the energy level of the primary cell 21. If this time exceeds a preset limit, the device may indicate impending depletion of the primary cell, for example by transmitting an end of battery life indication.

A processor, for example a microcontroller, of the device may determine when it should become active for the first time, for example using a brown out circuit. The processor may use a sleeping mode to conserve power; it may be configured to wake up to:
  Carry out housekeeping tasks; and/or
  Carry out a sensing and/or transmission task when sufficient power is available from the energy storage device 23.

One benefit of the illustrated embodiment is that some battery power is always available, for example, at a current of at least about 10 μA. Continuous availability of battery current may be used to ensure that the processor state and/or memory contents are secure at all times. This may avoid the need for non-volatile memory which generally requires a lot of energy for writing data into it. The processor may be configured to optimise use of the power available; it may be configured to control the frequency or point in time at which a component requiring a load current is in operation. The periodic provision of the load current may be controlled or programmed, for example by a processor; this may be used to control the time and/or conditions at which the load current is made available, as opposed to the load current being drawn simply upon demand from a power consuming device.

A number of aspects/embodiments of the invention have been described. It is to be understood that each aspect/embodiment may be combined with any other aspect/embodiment unless indicated to the contrary. Moreover, the invention is not restricted to the described embodiments, but may be varied within the scope of the accompanying patent claims.

The invention claimed is:

1. A power supply comprising a primary cell adapted to provide a primary cell current, the primary cell comprising:
   an active metal anode;
   a cathode current collector;
   an electrolyte in contact with the active metal anode and the cathode current collector;
   a passivation layer formed on a surface of the active metal anode by means of a chemical reaction between the active metal anode and the electrolyte;
   a resistor having a resistance from about 50 kiloohms to about 120 kiloohms, wherein the resistor is configured to limit the magnitude of the primary cell current, for the lifetime of the primary cell, to a maximum of a corresponding primary current density at which the passivation layer remains essentially unaffected, wherein the primary current density is 10 μA/cm² or less; and
   an energy storage device that is configured to be charged using the primary cell current and to periodically provide a load current at a magnitude greater than the primary cell current, wherein an output of the resistor is coupled to a first side of the energy storage device, and the active metal anode is coupled to a second side of the energy storage device.

2. The power supply in accordance with claim 1, in which the primary cell further comprises a liquid cathode lithium battery, particularly a lithium/thionyl chloride battery.

3. The power supply in accordance with claim 1, wherein the primary current density is the primary cell current per unit surface area of the anode.

4. The power supply in accordance with claim 1, wherein the current limiter resistor limits the primary current density to 5 μA/cm² or less.

5. The power supply in accordance with claim 1, wherein the energy storage device comprises a capacitor.

6. The power supply in accordance with claim 1, further comprising a device comprising a processor that is permanently powered by the primary cell current.

7. The power supply in accordance with claim 6, wherein the device comprises a data collector.

8. The power supply in accordance with claim 6, wherein the device comprises a machine condition monitor.

9. A method of operating a power supply comprising a primary cell which provides a primary cell current, the primary cell comprising:
   an active metal anode;
   a cathode current collector;
   an electrolyte in contact with the active metal anode and the cathode current collector;
   a passivation layer formed on a surface of the active metal anode by means of a chemical reaction between the active metal anode and the electrolyte;
   a resistor coupled to the cathode current collector, wherein the resistor has a resistance from about 50 kiloohms to about 120 kiloohms; and
   an energy storage device that is configured to be charged using the primary cell current and to periodically provide a load current at a magnitude greater than the primary cell current, wherein an output of the resistor is coupled to a first side of the energy storage device, and the active metal anode is coupled to a second side of the energy storage device, the method comprising:

limiting the magnitude of the primary cell current, for the lifetime of the primary cell, to a maximum of a corresponding primary current density at which the passivation layer remains essentially unaffected, wherein the primary current density is 10 $\mu A/cm^2$ or less.

10. The method according to claim 9, wherein the method further comprises:

charging the energy storage device using at least part of the primary cell current; and periodically using the energy storage device to provide a load current at a magnitude greater than the limited primary cell current.

11. The method in accordance with claim 9, wherein the method further comprises powering a data collector.

12. The power supply in accordance with claim 1, wherein the resistor prevents the primary cell current from ever, even upon first operation, causing the primary current density to exceed a level that causes the passivation layer to depassivate.

13. The power supply in accordance with claim 1, wherein the energy storage device has a discharge rate that is less than 1% of a continuous discharge rate of the primary cell.

* * * * *